United States Patent [19]

Doty

[11] 4,361,294

[45] Nov. 30, 1982

[54] TENSION RELIEVING MECHANISM

[75] Inventor: Gerald A. Doty, Crown Point, Ind.

[73] Assignee: Gateway Industries, Inc., Hazel Crest, Ill.

[21] Appl. No.: 208,947

[22] Filed: Nov. 21, 1980

[51] Int. Cl.³ .................... A62B 35/00; B65H 75/48
[52] U.S. Cl. ................... 242/107.7; 280/802
[58] Field of Search ............ 242/107.7, 107.6, 107.12, 242/107.4 R–107.4 E, 99, 84.3; 280/806–808, 803, 802; 297/474–478

[56] References Cited

U.S. PATENT DOCUMENTS

| | | | |
|---|---|---|---|
| 2,145,474 | 1/1939 | Burdick et al. | 242/84.3 |
| 2,159,004 | 5/1939 | Bosch | 242/107.7 |
| 2,209,467 | 7/1940 | Moore | 242/99 |
| 3,323,750 | 6/1967 | Worth et al. | 242/107.4 R |
| 4,124,175 | 11/1978 | Cislak | 242/107.7 |

Primary Examiner—John M. Jillions
Attorney, Agent, or Firm—Fitch, Even, Tabin, Flannery & Welsh

[57] ABSTRACT

A tension relieving mechanism for relieving the force exerted by a seat belt on a passenger employs a spring coil for frictionally gripping and holding a turntable with a belt reel shaft. A controllable actuating means having cams and stops controls the position of the spring coil and the diameter of the spring coil to either grip or release the grip on the turntable member in response to manipulation of the seat belt by the passenger. A remote control actuator also may change the spring coil diameter of release the tension relieving mechanism allowing automatic rewind of the belt with the opening of the vehicle door.

18 Claims, 11 Drawing Figures

TENSION RELIEVING MECHANISM

This invention relates to a safety belt system and more particularly to a system having a mechanism for relieving the seat belt engaging the passenger's body from at least a portion of the force from the reel winding spring.

This invention is directed to a belt system having a shoulder belt connected to a belt retractor having a winding spring which exerts tension on the belt to rewind the shoulder belt when the belt is removed from, the wearer. Present seat belt retractor systems, particularly the so called "single loop" systems, have a large or heavy winding spring to assure that the lap belt is pulled tightly across the wearer through a sliding D ring or tongue plate of a three-point restraining belt system. In the single loop and other three-point systems, it has been proposed to provide tension relieving devices, typically using discs to operate a pawl into and from engagement with a detent wheel fixed to the reel shaft. Such devices are shown in U.S. Pat. Nos. 3,851,836; 3,869,098 and 3,834,646. To assure release of such devices when a door of the vehicle is opened, it has been proposed in U.S. Pat. No. 3,973,786 to provide means operable by the door to shift the pawl to a release position to assure that the winding spring will rewind the seat belt, if it was not previously rewound, as the occupant opens the vehicle door to exit. The typical remotely controlled mechanism for releasing the tension relieving mechanism requires a turning of the retractor reel in the protraction direction for a slight distance to allow the pawl to be lifted from toothed engagement with the detent wheel. This is because the rake of the teeth on the detent wheel cause the tip of the detent wheel teeth to overhang the pawl preventing a simple outward movement of the pawl. These remote control release mechanisms have become heavy and complex in their mechanisms to overcome the strong retractor spring and to pivot the pawl from the detent wheel; and, as such, they have become expensive. Thus, seat belts will be rewound as intended.

The use of a solenoid to the tension relieving mechanism has also been disclosed in U.S. Pat. No. 4,002,111. Other proposals have been to provide a counterbiasing spring which acts in opposition to the winding spring and is connected thereto by a selectively operated pawl means. Such a proposal is disclosed in U.S. Pat. No. 4,026,494. Other proposals have been made to similarly connected counterbiasing springs which bias the reel in a belt unwinding direction when connected to the reel. In these systems, camming discs have been used to effect the connection and/or disconnection of the counterbiasing springs to the reel. When connected, the counterbiasing spring effectively subtracts from the winding torque of the reel winding spring to reduce the belt tension load on the occupant's shoulder.

Although some of the above-described proposals are in use, they generally involve a number of pieces which are relatively expensive by the time they are assembled and secured onto the retractor. Thus, there is a need for a new and improved kind of tensionless mechanism which eliminates the pawl and detent wheel and which may be released with a more simple mechanism requiring less force for operation thereof.

Accordingly, a general object of the invention is to provide a new and improved tension relieving retractor.

These and other objects and advantages of the invention will become apparent from the following detailed description taken in connection with the accompanying drawings in which.

As shown in the drawings for purposes of illustration, the invention is embodied in a conventional safety belt retractor 11 which may be of various shapes or configurations but typically includes an emergency energy operating locking mechanism 12 for operating to prevent further belt extraction at the time of an accident. While the emergency energy operating locking mechanism 12 may be of the belt or reel sensitive kind operated by fast protractions of the belt, the preferred emergency locking mechanism is of the vehicle inertia operated kind which comprises a pendulum weight 15 mounted on a support bar 16 for swinging movement to operate a pivotally mounted locking bar 17 to pivot into locking engagement with a pair of rachet wheels 21 mounted on opposite sides of a webbing reel 22 mounted for rotation on a reel shaft 27 extending between opposite vertical side frames 23 and 24 of a retractor frame 25. The reel shaft 27 is journaled to rotate in the side frames 23 and 24 and a spirally wound clock like spring 19 is attached to one end of the reel shaft 27 to rewind the seat belt 13. This rewind spring 19 is mounted within a protective cover attached to the side frame 24. Herein the tension relieving mechanism 14 is mounted to the opposite side frame 23 and is centered on the reel shaft 27 and is secured to the side frame 23.

Heretofore, the typical tension relieving mechanism, such as shown in U.S. Pat. No. 3,834,646, has employed a tension relieving pawl and rachet mechanism which is connected to the reel shaft with the tension relieving pawl being shifted by a pair of disk-like cams into and from the locking relationship with the tension relieving rachet wheel which is mounted on the reel shaft. The number of operating parts for this mechanism, and the complexities of their design, has resulted in a cost for the mechanism which results in its not being universally used. An associated cost is the high cost of the conventional remote control mechanism which senses when the door of the vehicle is opened so as to operate the tension relieving mechanism to its release position to assure that the seat belts are wound and are not left in the tensionless mode. Present automatic and remote control apparatus are quite cumbersome in complexity and size and therefore costly. One reason for the complexities and cost appears to be the need for the mechanism to apply sufficient force to turn the reel back in the belt protracting direction in order to turn back the engaged tooth on the tension-relieving rachet so that the rake of the tooth doesn't prevent upward movement of the tension relieving pawl to its released position whereby the reel spring is then free to turn the reel and rewind the belt.

In accordance with the present invention, a new and improved tension relieving mechanism 14 utilizing a locking coiled spring means 50 (FIG. 3) is provided which may be readily and easily controlled with and which has very few operating parts as compared with conventional tension relieving mechanism. The coiled spring means has a spring coil 62 for frictionally gripping a turnable member 63 connected to and turnable with the reel 22 and it is operated by a control or actuating means 52 which changes the diameter of the coil 62 to either frictional grip a friction surface 70 on the turnable member or to release the friction surface. The preferred and illustrated coiled spring means 50 has an outer or upper end or tang 60 which is operated by a first actuating means 54 which preferrably comprises stops and cams and inner or lower end 58 which is operated by a second actuating means 56 which also comprises stops and cams.

Figure 11:
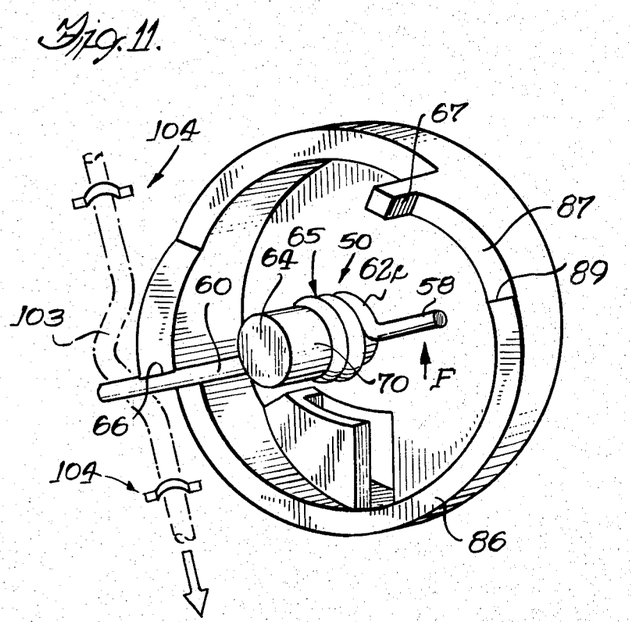
FIG. 11 is a perspective viewing showing the device in a tensionless position.

The preferred turnable member 63 is a shaft 64 which is an extension of the reel shaft 27 and the coil 62 encircles the shaft 64 to frictionally grip its cylindrical frictional surface 70 and when outer tang 60 is abutting a stop surface 66, as best seen in FIG. 11, the coiled spring means 50 holds the reel in a tensionless position. As will be explained in greater detail to release the tensionless mechanism, it is merely required to shift one of the tangs 58 or 60 to slightly increase the diameter of the coil 62 which then releases the frictional surface 70 allowing the reel shaft 27 and reel 22 to turn and rewind the belt.

Referring now in greater detail to the illustrated and preferred embodiment of the detail, the preferred coil spring means 50 comprises a single spring wound with a central cylindrical coil 62 having multiple turns, for example, three turns each having an inner diameter which frictionally grips the cylindrical surface 70 of the shaft 64 when the spring is free to contract inward toward its unflexed diameter. That is, the coils are wound to have a relaxed inner diameter which is less than the outer diameter of the shaft 64 so that when the spring is released and relaxed the coils contract and tightly grip the shaft surface 70 and prevent the shaft from turning when the first end 60 is abutted against the stop surface 66.

The preferred spring is made of wire and has an interference fit when its on the shaft. The number of coils may be varied, although approximately 3 to 6 coils are preferred, the coils being right or left hand wound depending on need. As will be explained in considerable detail hereinafter the spring may be readily released from its interference or release contact with the shaft 64 surface by moving either of the tangs 58 or 60 in a radially outward direction to increase the diameter of one or more of the coil turns 62a, 62b, or 62c.

The preferred control means 52 for controlling and actuating the coil spring means 50 to perform its functions of tension relieving and releasing the reel 22 to rewind the belt 13 comprises a simple and inexpensive stationary cup shaped control body 72 which has the plurality of cam surfaces thereon as well as stop surfaces which may perform all of the control functions for the coil spring means 50. As will be explained in greater detail hereinafter, the cam surfaces and the stop surfaces are so related to the spring means and the shaft 64, that the tensionless mechanism operates automatically in response to a sequence of movements of the belt which are commonly used to set the conventional tension mechanisms into the tensionless state and then to release them. That is, after buckling up the seat belt and giving a short extraction of additional webbing, the tensionless mechanism is operative to relieve tension. Short movements of the belt in the protraction direction, e.g. of about 6 inches or less, will not release the tensionless mechanism but a longer protraction will cause the tensionless mechanism to shift to its released state allowing the retractor spring 19 to turn the reel 22 and rewind the belt.

In this preferred embodiment of the invention, the control means 52 serves to shift the spring means 50 axially along the shaft 64 as well as to move the tangs 58 or 60 to positions to open the spring coil 62 to release the shaft 64. In addition to the stop surface 66 against turning (FIG. 11) in the rewind direction, the control member also has additional stop 67 (FIGS. 6 and 7) for engaging the tang 60 and limiting angular movement of the spring means 50 in the counter clockwise direction as viewed in these FIGURES. The stop 67 is on one side of an outwardly projecting post 69 on the cup shaped control body 72. The angular turning of the spring means 50 is also limited in the clockwise direction when the inner tang 58 abuts an inner stop 74 which, herein, is in the form of an axially projecting wall projecting normally from an integrally connected bottom wall 75 of the cup shaped control body 72. The stops 67 and 74 on the control body 72, and tangs 58 and 60 on the spring means 50, are so positioned in assembly to allow the coiled spring means to turn almost 360 degrees between its FIG. 4 and FIG. 6 positions.

Figures 4, 5:
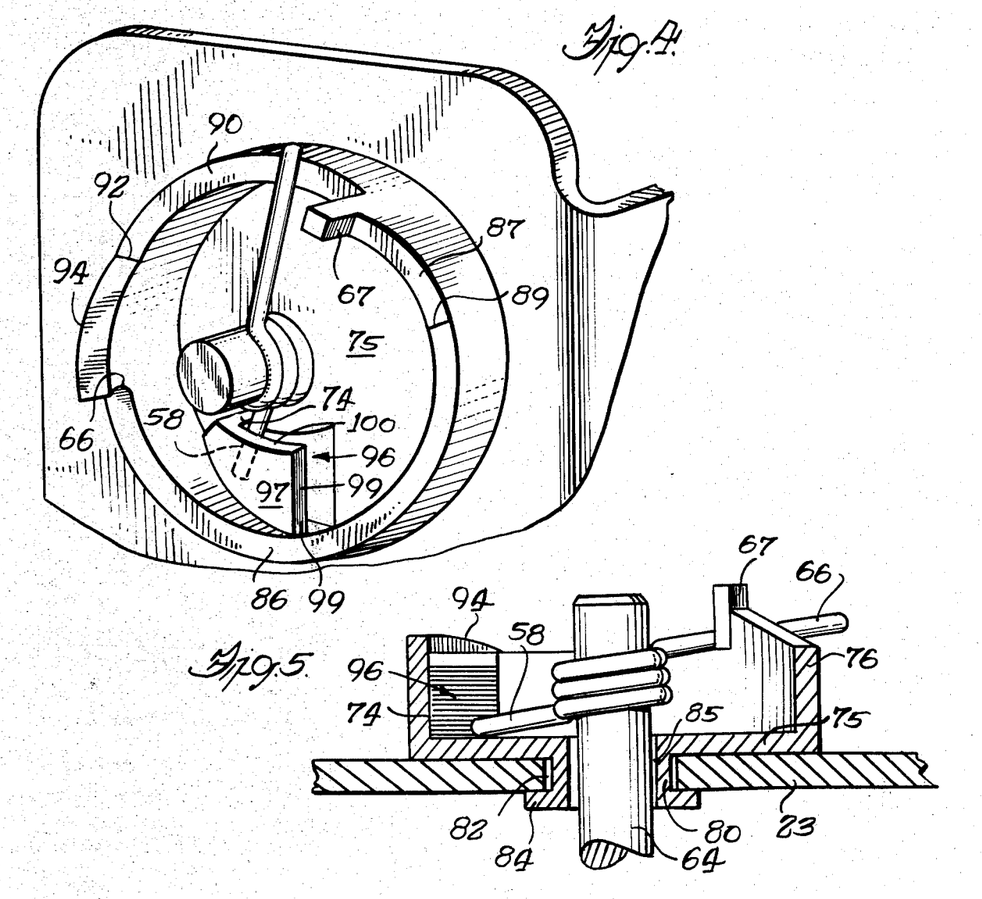
FIG. 4 is a view of the tension relieving apparatus in its condition when the webbing is fully wound.
FIG. 5 is a sectional view of the apparatus of FIG. 4.

In addition to the stops 66, 67, and 74, the control means 52 also comprises a plurality of cam surfaces which act to shift the spring means axially along the shaft 64 and to allow the spring coil 62 to grip or release the shaft 64. The cam surfaces for the outer tang 60 are located along the outer peripheral edge of the control body 72, in this instance. As will be described in connection with a further embodiment of the invention, control means may comprise several members which are movable relative to one another whereas it is preferred, in this first described embodiment invention, to use but a single stationary cup shaped, control body 72 which may be made of molded plastic. The illustrated molded plastic body has an annular wall 76 of cylindrical shape integrally connected to a base or bottom wall 75 which is abutted against the retractor side frame 23, as best seen in FIG. 5. An easy manner for connection of the control means body is to provide it with a hub 80 of cylindrical shape which will fit through an opening 82 in a side frame center on the axis of the shaft 64 and the co-axial reel shaft 27. A pair of retaining ears 84 are formed diametrically opposite and are inserted through slots in the retractor side frame and the ears 84 are turned from the slots to abut the inside of the retractor frame side wall 23 to clamp the base wall 75 against the outer side of the retractor side frame 23. An internal hollow bore 85 in the body 71 receives shaft 64.

Figure 6:
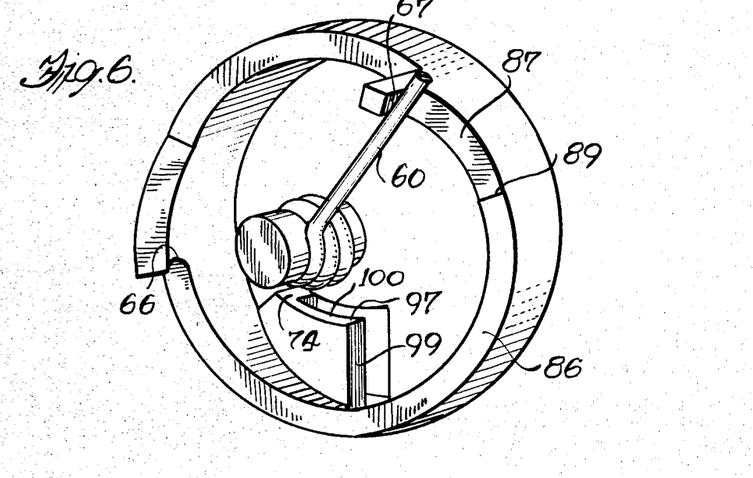
FIG. 6 is a perspective view of the tension relieving apparatus in a position to bias the spring to shift axially upwardly.
Figure 7:
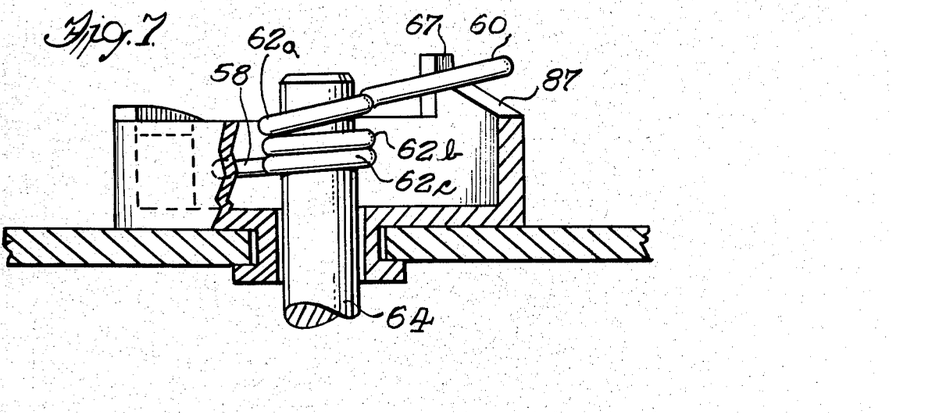
FIG. 7 is a sectional view of the apparatus shown in FIG. 6.
Figure 8:
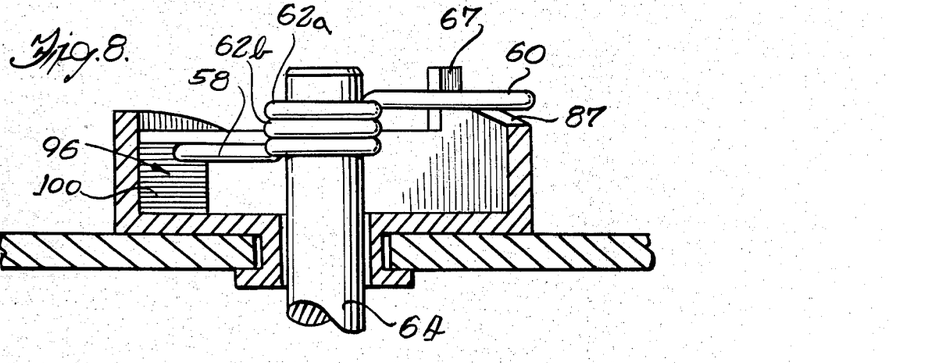
FIGS. 8 and 9 are sectional views showing the coiled spring shifted to an upper position for turning with the shaft.

The preferred cam surfaces for controlling the tang 60 comprises a central memory surface 86 along which the tang 60 rides while the tension relieving mechanism is operating. The memory cam 86 is in a plane parallel to the retractor side wall 23 and performs no lifting function. An outward or upward lifting cam 87 which is inclined outward relatively to the retractor side wall 23 acts as a lifting means which causes the outermost coil to lift as shown in FIG. 7. The memory cam 86 has an interface 89 with the lifting cam 87 as best seen in FIG. 6. The lifting cam terminates at stop 67 at one side and the memory cam 86 terminates at stop 66 at its other end.

Opposite the memory cam 86 is a start cam 90 along which the tang 60 starts to travel when the belt is initially protracted as will be described in detail hereinafter. The start cam is in a plane parallel to the base wall 75 and performs no lifting function and extends from the face 68 of the outwardly projecting post 69 to an interface 92 with another raising cam 94 which is inclined upwardly or outwardly to the stop 66.

Figure 10:
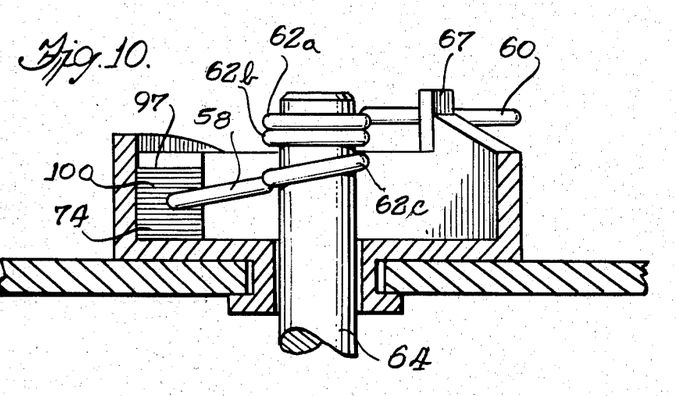
FIG. 10 is a sectional view of the spring having a coil biased to shift the spring to a lower position.

The lower tang 58 is shifted axially by a lower cam 96 which is formed by a molded inclined wall 97 which extends upwardly and outwardly from the bottom wall 75 in the counter clockwise direction as viewed in FIG. 4. The inclined wall 97 terminates in an end wall 99 which is spaced from the bottom wall 75 by a considerable distance which provides a space to receive the lower tang 58 to enter to engage the underside 100 of the inclined wall 97 and to be cammed downwardly toward the stop 74 to cause a release of the interference fit of the coils 62 with the shaft 64, as best seen in FIG. 10. Also, when the lower tang 58 is in its inner and lower position abutting the stop 74, the latter holds the coil spring means against turning in the clockwise direction as viewed in FIG. 4.

A description of the operation of the retractor and the tension relieving will now be given in reference to the sequence of drawings from FIGS. 4 through 10. The starting position will usually be with the seat belt webbing stowed and fully wound onto the reel 22 prior to the occupant's pulling of the belt 13 to lift the belt to a position about his body. At this initial rewind position, the inner tang 58 is at the lower end of the lower cam 96 contacting the inner stop 74. The tang 60 is resting on the cam 90 at the angular location, shown in FIG. 4. As the webbing 13 is extracted from the retractor, the reel shaft 64 turns in the counter clockwise direction as viewed in FIG. 4. to traverse the cam 90 to an interface 92 with the inclined cam 94. Continued outward movement of the belt and rotation of the shaft 64 causes the tang 60 to travel up the inclined cam 94, drop over the stop 66, and to travel along the memory cam 86 to interface 89 with the cam lifting surface 87 which causes the upper coil 62a to lift upwardly coils 62b and 62c as shown in FIG. 7. When the tang 60 abuts the stop 67 the other two clutch coils 62b and 62c are still gripping the shaft 64 as shown in FIG. 7. At this time, the lower tang 58 will have left the lower cam 96 and will be in the position shown in FIG. 7. When the tang 60 is restrained by the stop 67, the slightest further belt withdrawn and turning of the shaft opens the spring coil 62 releasing the spring to shift axially long the shaft to an outer position shown in FIG. 8 whereby all of the coils are generally raised to the position shown in FIG. 8. As the webbing is continued to be extracted, the shaft 64 is free to turn within the coil 62 because the coils 62a, 62b and 62c will have been expanded so long as tang 60 is held by the stop 67 and the shaft 64 continues to turn in the counter-clockwise direction.

Figure 9:
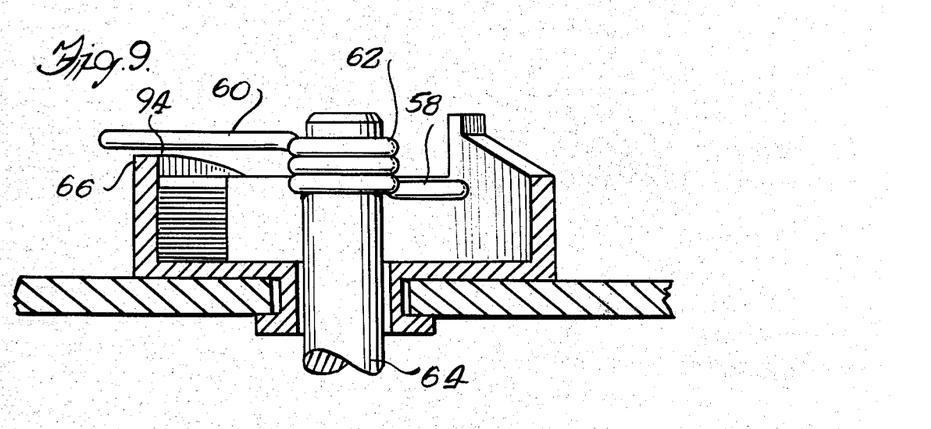

In the normal course of buckling the seat belt tongue into the buckle and then releasing the buckle after having engaged the tongue plate with the buckle, the retractor rewinds a small amount of the seat belt, i.e. rewinds any excess webbing back on to the retractor reel 22 which rewind operation reverses the rotation of the retractor shaft 27 to the clockwise direction operation which allows tang 60 to move off the stop 67 and allows the spring coil 62 to again grip the shaft surface 70. Because of the prior upward or outward movement of the spring means 50 along the shaft 64, the upper tang 60 is located sufficiently upward and outwardly (FIG. 9) that it will now clear stop 66. Thus, the spring means 50 and shaft 64 continue to rotate as a unit in the belt retracting direction until the lower tang slides down along the cam surface 100 and pulls down the coil 62c relative to the other coils 62a and 62b to bias the spring coil 62 to shift downwardly along the shaft surface 70. With the continued rewind of the belt, the inner tang 58 abuts the inner stop 74 to restrain further clockwise turning movement of the clutch spring. Because of this loading of the spring in a downward direction, as shown in FIG. 10, as the shaft 64 continues to turn and drive the tang 58 against the inner stop 74, the coils 62a, 62b and 62c expand and the coil 62 is then free to shift axially downwardly or inwardly along the shaft 64 to the position closer to the retractor side wall 23, as shown in FIG. 5. The tensionless mechanism has thus returned to its original position, shown in FIG. 4. The retractor is free to rewind all of the webbing 13 with upper tang 60 resting on the cam 90. If the occupant unbuckles, the retractor will freely rewind all of the webbing with the spring coil 62 being de-clutched from the shaft 64.

Assuming the occupant desires to hold the belt tensionless, the occupant will shift his shoulders forward for a slight movement or grip the seat belt with his hand in pulling the seat belt forward to set the tensionless mechanism. Possibly, 1 to 1½ inch of webbing will be extracted from the retractor as the occupant leans forward in his seat. This protracting of the belt reverses the rotation of the shaft 64 to cause the spring coil 62 to contract as the tang 58 leaves stop wall 74 and causes the outer tang 60, to traverse cam 90, and ride up along cam surface 94 (FIGS. 4 and 5), and then drop down on cam 86 and remain on this cam.

If the seat belt occupant now leans back to his normal position, the retractor spring will turn the reel 22 and shaft 64 causing the tang 60 to move clockwise along the cam 86 to abut the stop 66. With the long tang 60 engaging the stop surface 66 and the coils 60a, 60b and 60c gripping the shaft 64, the protracted belt will be relieved of the rewind spring force thereby relieving the extended belt about occupant's body from the retractor's spring force. The belt is now tensionless. Because the spring coil 62 was at its lower elevation during this setting operation, the tang 60 will be spring loaded on the memory cam 86.

Figure 1:
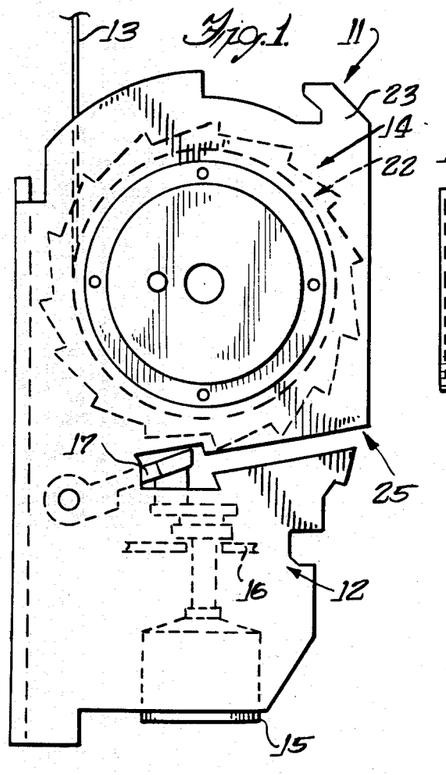
FIG. 1 is a side elevational view of a retractor embodying the tension relieving device of the present invention.
Figure 2:
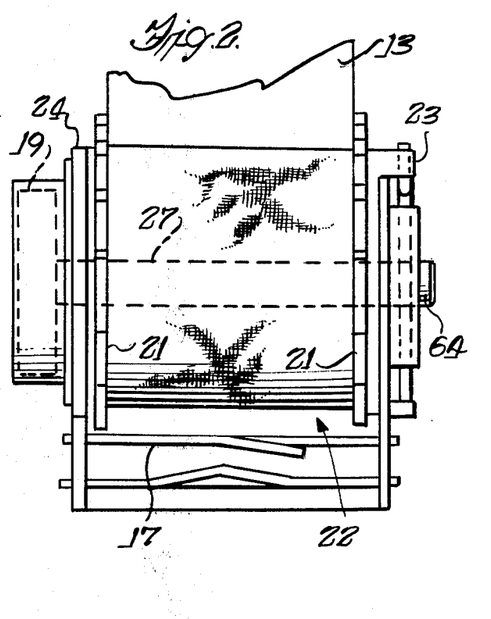
FIG. 2 is a front view of the retractor of FIG. 1.
Figure 3:
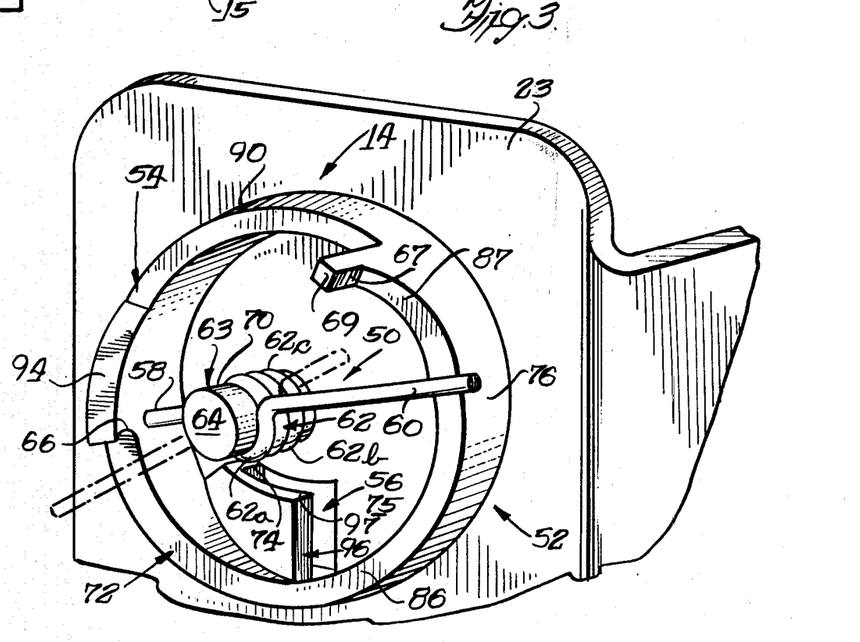
FIG. 3 is an enlarged perspective view of the tension relieving apparatus constructed in accordance with the preferred embodiment of the invention.

With the tensionless mechanism set as above-described with the tang 60 abutted against the stop 66 and the coil 62 tightly gripping the shaft 64, the memory cam 86 allows the occupant to lean forwardly and shift about with the tang 60 moving along the memory surface, as shown in FIG. 3, which allows about six inches of web protraction, in this instance. That is, the tang 60 will slide along cam 86 from the stop 66 toward the interface 89 with the lifting cam 87 as the belt is protracted and then the tang 60 will return to the stop 66 as the occupant leans back to his normal position. Thus, the tang 60 will remember its original setting and returns to this setting as long as the occupant doesn't extend the belt too far and returns back to his normal setting position.

The occupant may release the belt 13 from the tensionless mode merely by extending the belt out sufficiently to traverse the memory cam 86 and lifting cam 87 to cause the tang 60 to hit the stop 67 so that further protraction of the belt expands the coil 62 which now has its upper coil 62a lifted due to the lifting cam 87, as shown in FIG. 7 and then by the occupant releasing the belt. The coil 62 will now be in upper position shown in FIGS. 8 and 9 and gripping the shaft 64 to turn in the clockwise direction past the stop 66 so long as the belt continues to rewind onto the reel. The lower tang 58 will engage the lower cam side 100 and will pull the lower coil 62c down as shown in FIG. 10, and then when the lower tang 58 slides down the lower cam and hits the stop 74 and opens the coil 62, the coil will slide down to the position shown in FIGS. 4 and 5 which is the start position for a fully wound reel.

The remote control method preferred to actuate the tensionless mechanism to release the same requires only a very small upward lifting force applied to the tang 60 while it is abutting the stop 66 and is being urged by the shaft 64 to turn in the clockwise direction as viewed in FIG. 11. By way of example, the remote control actuator may be a simple wire form for having an upwardly bowed cam 103 therein which may be shifted along the side of the retractor slide frame 23 to cam the tang 60 upwardly above the upper outer end of the stop surface 66 whereupon the tang will be driven by the clutched spring coil 62 and shaft 64 to the position shown in FIG. 4 in which the lower tang 58 has moved beneath the cam surface 100 to abut the stop 74 thereby expanding the clutch coil 62. The retractor will freely rewind all of the webbing with the spring coil 62 being de-clutched from shaft 64. The simple lifting of the tang 60 does not require the force needed for conventional release mechanisms nor require turning of the reel in the protraction direction to release the pawl from a detent wheel as in some prior art tensionless mechanisms. With the simple wire form, the remote mechanism may be made very inexpensively. The wire form may slide for straight line movement and be guided by suitable means such as brackets 104 for such straight line movement along and parallel to the retractor side frame 23.

Another method of release of the tensionless state by a remote control mechanism to exert an external tangential force F, as if viewing in FIG. 11, to the lower tang 58 in the direction to expand the lower coil 62c and the other coils 62b and 62a whereby the coils no longer grip the shaft 64. The retractor return spring then can rewind the web onto the reel with the reel shaft 27 and the shaft 64 turning within the coil. On a subsequent protraction of the belt the tang 60 will merely begin at the stop 66 and then travel to the stop 67 and up the cam surface 87 to the position shown in FIGS. 6 and 7 as previously described at the initial web pullout from a fully wound position of the retractor.

It will be appreciated that the spring coil 62 which is externally wound about the friction surface 70 on the shaft 64 may be reversed to become an internal coil disposed within a cylindrical frictional cylindrical surface so that expansion of the spring coils causes a frictional gripping or clutching with the frictional surface. Thus, the motions and structure may be reversed and still fall within the invention.

In accordance with other embodiments of the invention it is possible to use a separate coiled spring as a clutch and a separate coiled spring as a brake or tensioning relieving device to perform the functions of the single coiled spring disclosed herein. The use of several springs rather a single spring disclosed herein also falls within the purview of this invention.

A further embodiment of the invention has been constructed in which the actuating or control means 50 comprises a first stationary ring and a second movable ring which is shifted by the inner tang 58. Thus, the control or actuating means may also take various forms and still fall within the purview of this invention.

What is claimed is:

1. In a safety belt retractor, a rotatable reel having a belt wound thereabout for protraction and retraction from the reel;

a spring means biasing the reel to retract and to rewind the belt into the reel;
   a locking means for locking the belt against further protraction at the time of an accident;
   a tension relieving means for reducing the belt tension from that being exerted on the protracted belt by said return spring;
   said tension relieving means including a rotatable member connected to said reel to rotate therewith and having a friction surface thereon;
   a coiled spring means having a coil for frictionally engaging said frictional surface with a change in size of the coil to hold said member and said reel against rewinding the protracted belt thereby relieving tension of said spring means on the protracted belt worn by the occupant, and
   control means for changing the size of said coil either to release said friction surface for turning or to hold said frictional surface,
   the spring coil being positioned by said control means to cause the spring coil to frictionally engage the frictional surface and to relieve the tension on the belt after a predetermined distance of belt protraction following an initial belt protraction and slight retraction,
   said spring coil being positioned by said control means to release the frictional surface after protraction through a greater distance than said predetermined distance and followed by a release of the belt and to stay released from the frictional surface allowing a rewind of the belt completely onto the reel.

2. A safety belt retractor in accordance with claim 1 in which said rotatable member is a shaft connected to said reel and in which said coil is wound about said shaft and contracts to grip the shaft to provide the tensionless state and expands to release the shaft to allow rewinding of the belt.

3. A retractor in accordance with claim 1 in which said coiled spring means comprises a first spring tang connected to one end of the coil and a second tang connected to the other end of the coil, and in which said control means comprises a first means for actuating the first tang of said coil and a second means for actuating the second tang of said coil to change the size of the coil to selectively release or grip said frictional surface.

4. A safety belt retractor in accordance with claim 3 in which said first means comprises a cam means having a surface for shifting axially the first tang of the coil relative to the coil and in which said second actuating means comprises a cam surface for shifting the second tang of the coil relative to the coil.

5. A safety belt retractor in accordance with claim 4 in which said rotatable member is a portion of a reel shaft and in which said coiled spring means is shifted axially along said shaft by said first and second cam means.

6. In a safety belt retractor, a rotatable reel having a belt wound thereabout for protraction and retraction from the reel;
 spring means biasing the reel to retract and to rewind the belt into the reel;
 a locking means for locking the belt against further protraction at the time of an accident;
 a tension relieving means for reducing the belt tension from that being exerted on the protracted belt by said return spring;
 said tension relieving means including a rotatable member connected to said reel to rotate therewith and having a friction surface thereon;
 a coiled spring means having a coil for frictionally engaging said frictional surface with a change in size of the coil to hold said member and said reel against rewinding the protracted belt thereby relieving tension of said spring means on the protracted belt worn by the occupant, and
 control means for changing the size of said coil either to release said friction surface for turning or to hold said frictional surface,
 said coiled spring means comprising a first spring tang connected to one end of the coil and a second tang connected to the other end of the coil, and in which said control means comprises a first means for actuating the first tang of said coil and a second means for actuating the second tang of said coil to change the size of the coil to selectively release or grip said frictional surface,
 said first means comprising a cam means having a surface for shifting axially the first tang of the coil relative to the coil and in which said second means comprises a cam surface for shifting the second tang of the coil relative to the coil,
 said control means further comprising a memory surface along which said first spring end travels while the tension-relieving means is operative.

7. In a safety belt retractor and a rotatable reel having a belt wound thereabout for protraction and retraction from the reel;
 a reel shaft mounting the reel for rotation;
 spring means biasing the reel to retract and to rewind the belt onto the reel;
 a locking means for locking the belt against further protraction at the time of an accident;
 a tension relieving means for reducing the belt tension from that being exerted on the protracted belt by said return spring;
 said tension relieving means including an extension on said reel shaft having a friction surface thereon;
 a single coiled spring mounted on said shaft extension and having a coil for frictionally engaging said friction surface with a contraction in size of the coil to hold said reel shaft against turning and rewinding the protracted belt thereby relieving tension of said spring means on the protracted belt worn by the occupant, and a control means for changing the size of said coil either to release said friction surface for turning or to hold said frictional surface against turning, said control means shifting said coiled spring axially along said shaft, the said coil spring gripping said frictional surface to travel therewith, the control means includes first means to engage the spring and hold it in a first predetermined position at complete belt rewind, second means operable to engage the spring and open its coil to allow the shaft to turn and to allow the belt to protract independently of the spring, and third means to hold the spring when gripping said frictional surface to hold the reel shaft and belt against turning to rewind and thereby relieve the belt of tension from the spring means.

8. In a safety belt retractor and a rotatable reel having a belt wound thereabout for protraction and retraction from the reel;
 a reel shaft mounting the reel for rotation;
 spring means biasing the reel to retract and to rewind the belt onto the reel;
 a locking means for locking the belt against further protraction at the time of an accident;
 a tension relieving means for reducing the belt tension from that being exerted on the protracted belt by said return spring;
 said tension relieving means including an extension on said reel shaft having a friction surface thereon;
 a single coiled spring mounted on said shaft extension and having a coil for frictionally engaging said friction surface with a contraction in size of the coil to hold said reel shaft against turning and rewinding the protracted belt thereby relieving tension of said spring means on the protracted belt worn by the occupant, and a control means for changing the size of said coil either to release said friction surface for turning or to hold said frictional surface against turning, said control means shifting said coiled spring axially along said shaft, said control means comprising a stationary body fixed to said retractor, cam surfaces on said body to cause said coiled spring to shift axially along said shaft extension, and stops on said stationary body to limit turning of the coiled spring with said shaft extension.

9. In a safety belt retractor and a rotatable reel having a belt wound thereabout for protraction and retraction from the reel;
 a reel shaft mounting the reel for rotation;
 spring means biasing the reel to retract and to rewind the belt onto the reel;
 a locking means for locking the belt against further protraction at the time of an accident;
 a tension relieving means for reducing the belt tension from that being exerted on the protracted belt by said return spring;
 said tension relieving means including an extension on said reel shaft having a friction surface thereon;
 a single coiled spring mounted on said shaft extension and having a coil for frictionally engaging said friction surface with a contraction in size of the coil to hold said reel shaft against turning and rewinding the protracted belt thereby relieving tension of said spring means on the protracted belt worn by the occupant, and a control means for changing the size of said coil either to release said friction surface for turning or to hold said frictional surface against turning, said control means shifting said coiled spring axially along said shaft;
 a remotely controlled actuating means for shifting one end of said coiled spring in a direction to expand said coil and thereby releasing said coil from gripping said shaft extension and allowing the belt to rewind.

10. In a seat belt retractor apparatus having a frame and a reel means on said frame with a rotatable reel with a webbing wound thereon, a return spring means connected to said reel and operable to rotate said reel in a rewind direction to rewind the webbing, the improvement comprising a tension relieving mechanism having:

a shaft means connected to said reel to rotate in connection with said reel and operable to hold said reel against turning in the rewind direction against the urging of said rewind spring; a locking spring wound about said shaft means to grip and to hold the same against turning in the rewind direction;

said locking spring having opposite end portions movable in directions to cause said locking spring to grip said shaft means or to release said shaft means, said locking spring being turnable with said shaft means;

and a control means mounted on said frame and operable to shift said end portions to cause said locking spring to grip said shaft means to hold said webbing tensionless after a webbing extraction movement followed by a webbing rewind movement, the spring coil being positioned by said control means to cause the spring coil to frictionally engage the shaft means and to relieve the tension on the belt after a predetermined distance of belt protraction following an initial belt protraction and slight retraction, said spring coil being positioned by said control means to release the frictional surface after protraction through a greater distance than said predetermined distance and followed by a release of the belt and to stay released from the frictional surface allowing a rewind of the belt completely onto the reel.

11. An apparatus in accordance with claim 10 in which said control means holds one end of said locking spring while the other end of said locking spring is shifted by said control means to expand said locking spring to release said shaft means.

12. In a seatbelt retractor apparatus having a frame and a reel means on said frame with a rotatable reel with a webbing wound thereon, a return spring means connected to said reel and operable to rotate said reel in a rewind direction to rewind the webbing, the improvement comprising a tension relieving mechanism having, a shaft means connected to said reel to rotate in connection with said reel and operable to hold said reel against turning in the rewind direction against the urging of said rewind spring; a locking spring wound about said shaft means to grip and to hold the same against turning in the rewind direction;

said locking spring having opposite end portions movable in directions to cause said locking spring to grip said shaft means or to release said shaft means, said locking spring being turnable with said shaft means;

and a control means mounted on said frame and operable to shift said end portions to cause said locking spring to grip said shaft means to hold said webbing tensionless after a webbing extraction movement followed by a webbing rewind movement, said control means shifting said end portions to cause said locking spring to release said shaft means after a predetermined movement of said locking spring and said shaft means in the webbing extraction direction, said control means comprising a stationary body mounted on said frame means and having a first cam surface for engaging and operating one end portion of said locking spring and a second cam surface for engaging and operating the other end portion of said spring.

13. An apparatus in accordance with claim 12 in which one end portion of said locking spring slides along a portion of said first cam surface and is shifted axially relative to said shaft means to bias said locking spring to shift axially along said shaft means.

14. An apparatus in accordance with claim 12 in which each end portion of said spring means is shifted axially of said shaft means by said control means.

15. In a seat belt retractor apparatus having a frame and a reel means on said frame with a rotatable reel with a webbing wound thereon, a return spring means connected to said reel and operable to rotate said reel in a rewind direction to rewind the webbing, the improvement comprising a tension relieving mechanism having a shaft means connected to said reel to rotate in connection with said reel and operable to hold said reel against turning in the rewind direction against the urging of said rewind spring; a locking spring means wound for contact with said shaft means to grip and to hold the same against turning in the rewind direction;

said locking spring means having opposite end portions movable in directions to cause said locking spring to grip said shaft means or to release said shaft means, said locking spring means being turnable with said shaft means;

control means mounted on said frame and operable to shift said end portions to cause said locking spring means to grip said shaft means to hold said webbing tensionless after a webbing extraction movement followed by a webbing rewind movement, said control means shifting said end portions to cause said locking spring means to release said shaft means after a predetermined movement of said locking spring and said shaft means in the webbing extraction direction, and a remote control means for actuating one of said end portions of said spring means to cause said locking spring means to release said shaft means to rewind said belt from a tensionless condition.

16. A retractor apparatus in accordance with claim 15 in which said remote control means comprises a cam for shifting said one end portion in a direction to allow the spring means to expand and release its grip on said shaft means.

17. A retractor apparatus in accordance with claim 16 in which said cam is mounted for rectilinear movement and shifts said end portion to release said spring.

18. A retractor apparatus in accordance with claim 17 in which said cam is formed on a wire form.

* * * * *